(No Model.)　　　　　　　　　　　　　　　　　4 Sheets—Sheet 1.
G. W. GARDANIER.
DUPLEX AND QUADRUPLEX TELEGRAPH.
No. 283,995.　　　　　　　　　　　Patented Aug. 28, 1883.
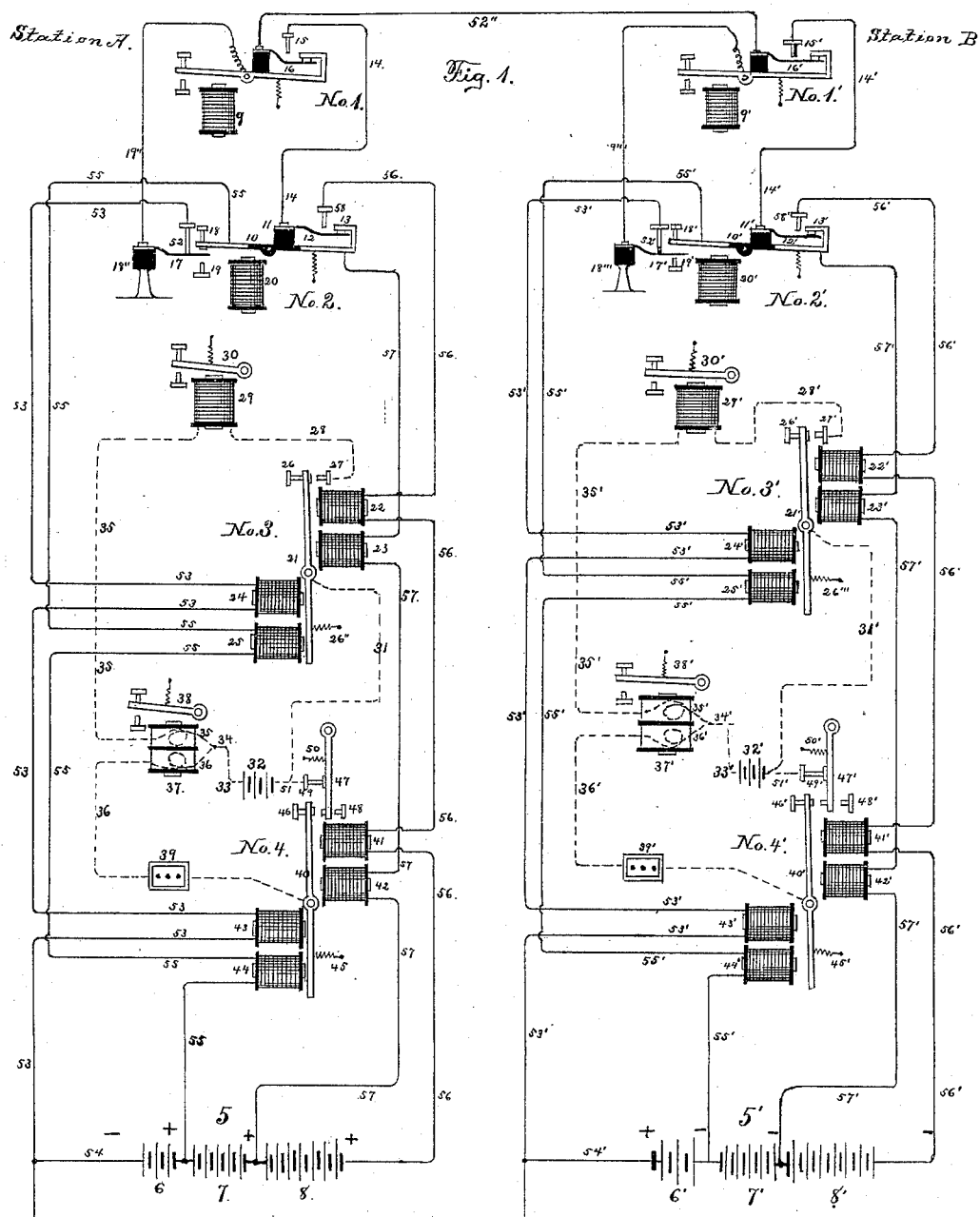
Attest;
Walter Fowler.
Chas. O. Gill
Inventor;
George W. Gardanier,
By his Attorney,
Rowland Cox.

(No Model.) 4 Sheets—Sheet 2.
G. W. GARDANIER.
DUPLEX AND QUADRUPLEX TELEGRAPH.
No. 283,995. Patented Aug. 28, 1883.
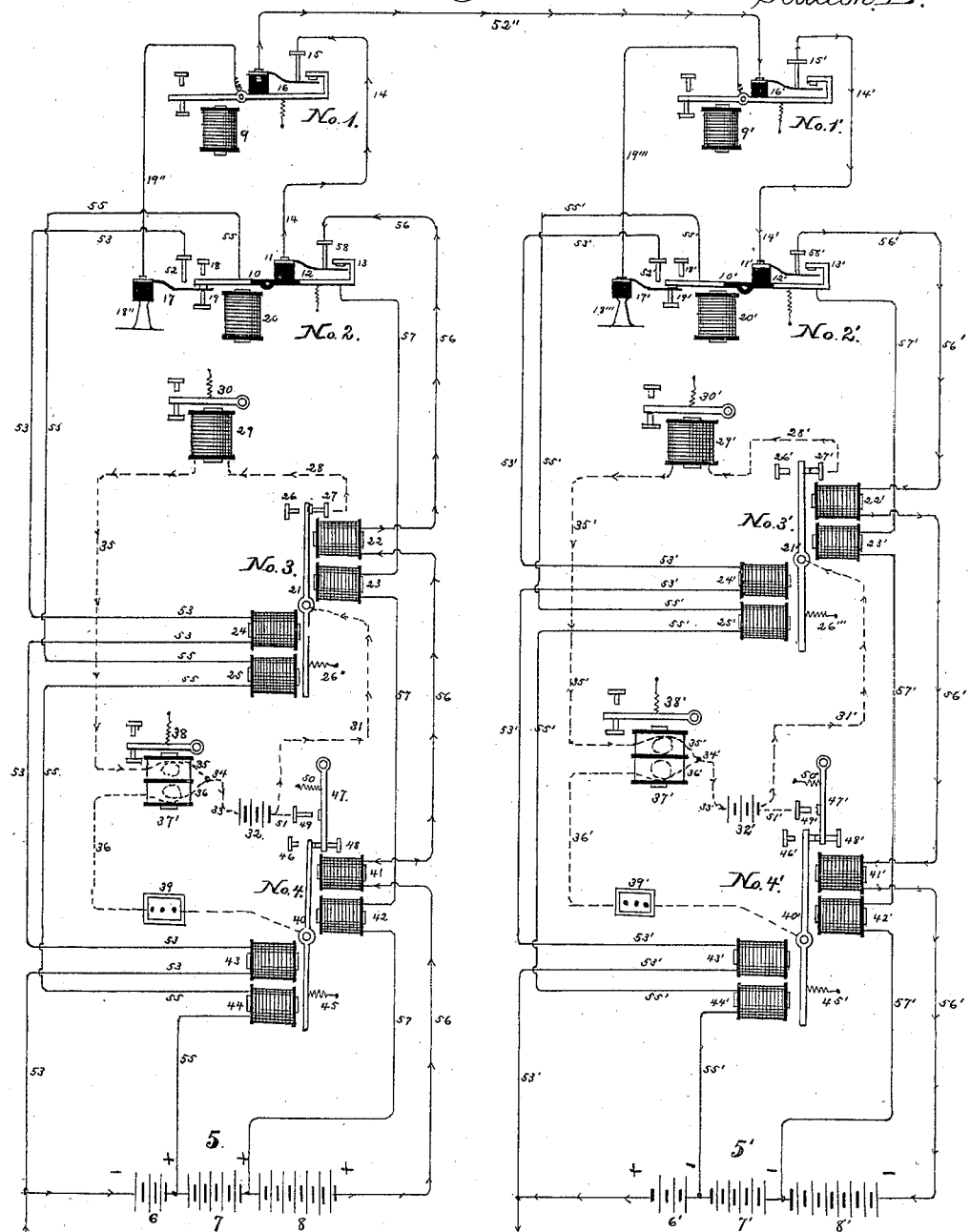

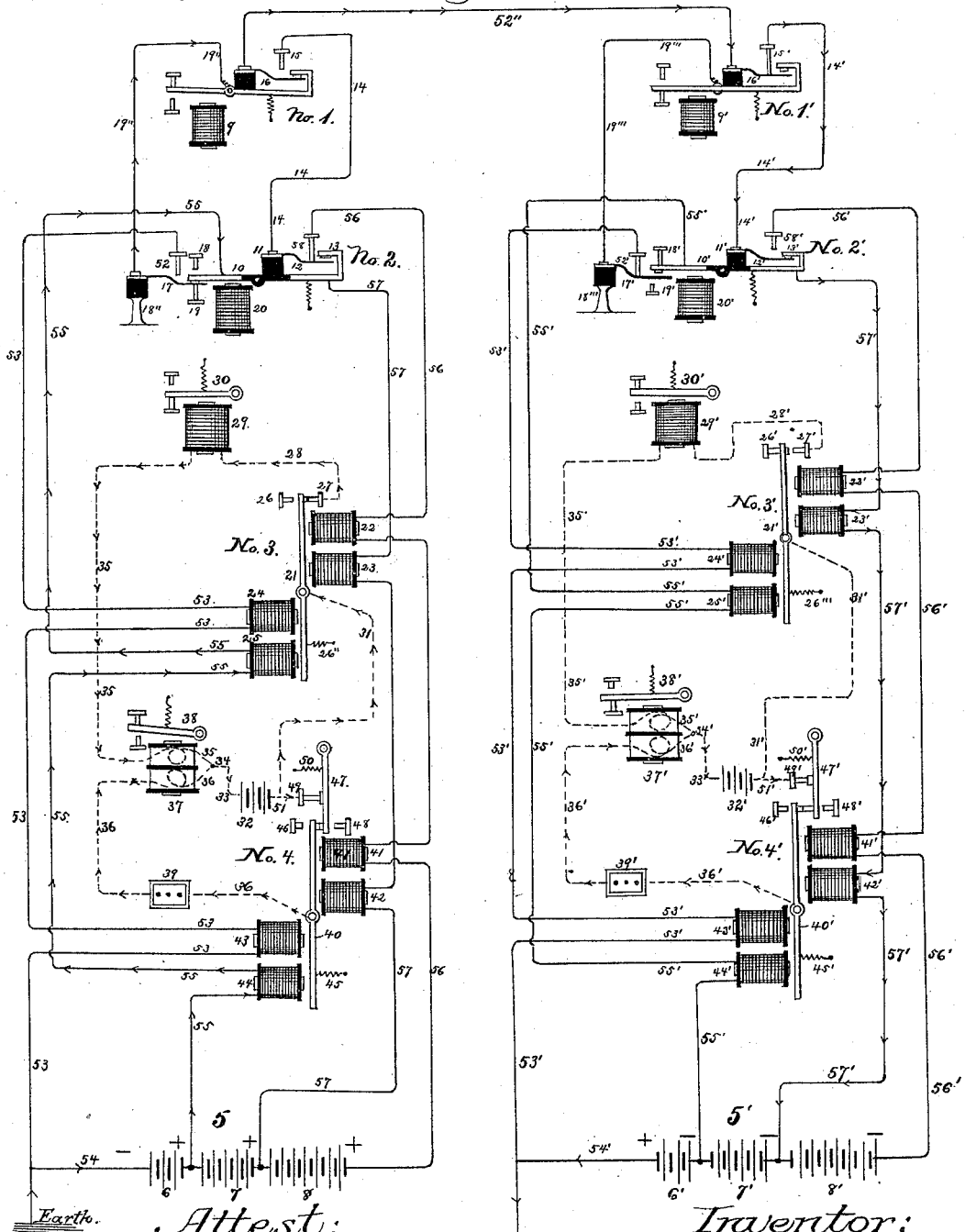

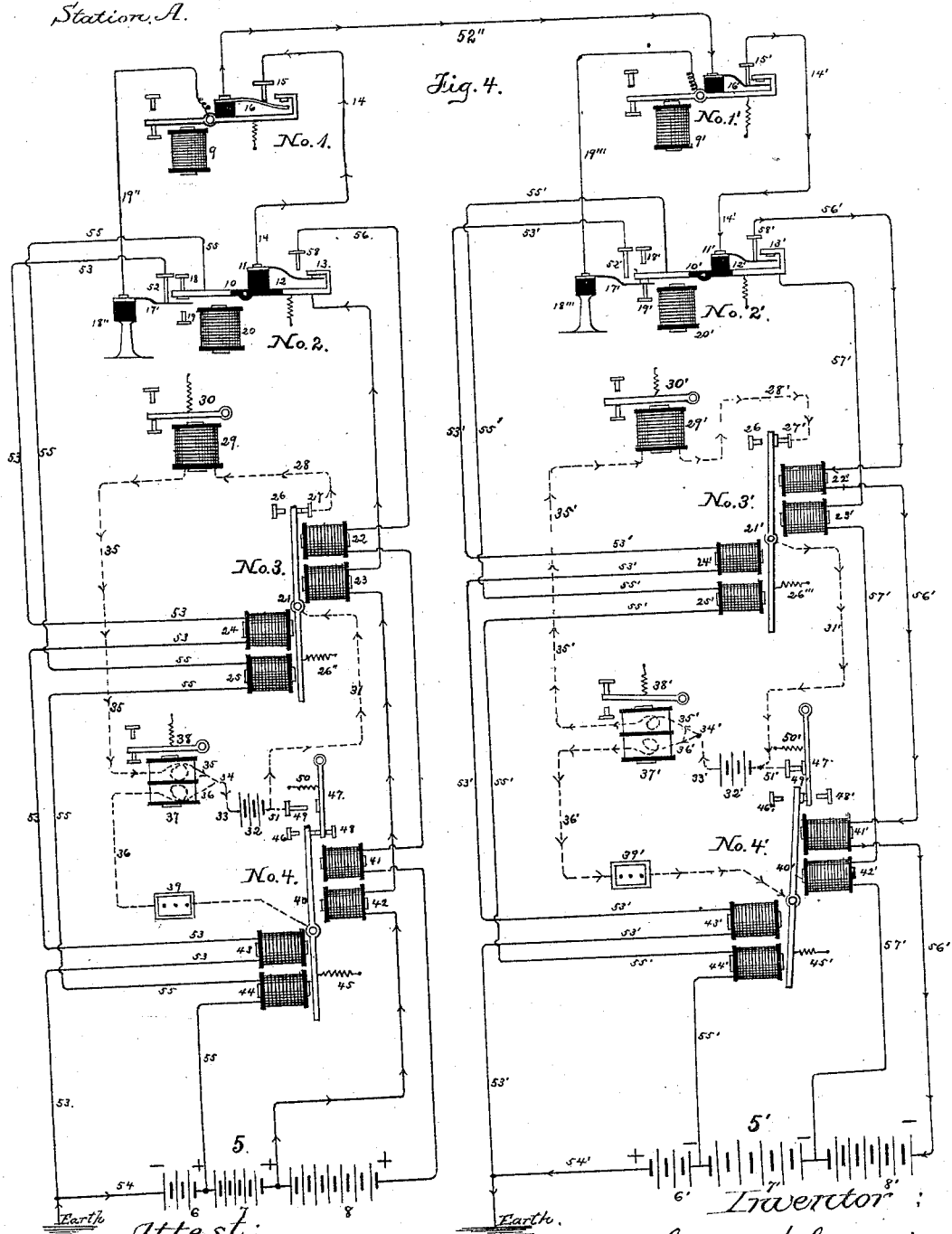

UNITED STATES PATENT OFFICE.

GEORGE W. GARDANIER, OF NEW YORK, N. Y.

DUPLEX AND QUADRUPLEX TELEGRAPH.

SPECIFICATION forming part of Letters Patent No. 283,995, dated August 28, 1883.

Application filed October 30, 1882. (No model.)

*To all whom it may concern:*

Be it known that I, GEORGE W. GARDANIER, a citizen of the United States, residing at New York, in the county of New York and State of New York, have invented certain new and useful Improvements in Telegraphy; and I do hereby declare the following to be a full, clear, and exact description of the invention, such as will enable others skilled in the art to which it appertains to make and use the same.

This invention relates to an improvement in telegraphy, and particularly to a system of telegraphy for multiple transmission in which a separate electro-magnet is provided for each outgoing current, and is adjusted above the strength of said current, so as not to be affected by it.

The nature and method of application of the invention will be understood from the detailed description hereinafter presented, reference being had to the accompanying drawings, which illustrate my invention embodied in a quadruplex apparatus, or one adapted to permit the simultaneous passage over the line-wire of four distinct communications, two in each direction, without the receiving-instruments at the respective transmitting-stations being affected by the outgoing currents.

In all of the views presented in the drawings, "station A" may be considered as the home or transmitting station and "station B" as the opposite terminal or receiving station, although it will be understood that communications may be transmitted from either station and received at the other or from both stations simultaneously, and be intelligible at each opposite terminal, without the receiving-instruments at the respective stations being disturbed by their associate transmitters.

In a quadruplex system of telegraphy there are four conditions of the wires and the passage of the currents through them, and in the drawings I have illustrated these conditions, Figure 1 showing the apparatus when both transmitters at station A are open or in their normal positions; Fig. 2, when both of said transmitters are closed; Fig. 3, when transmitter No. 1 is open and transmitter No. 2 closed; and Fig. 4, when transmitter No. 1 is closed and transmitter No. 2 is open, which is the fourth condition of the apparatus. In the accompanying drawings I have illustrated the main wires of the apparatus by full lines and the local wires by broken or dotted lines, and upon each of these lines the arrows indicate the direction of the current.

The apparatus at station B is an exact duplicate of that at station A, and hence in describing in detail the elements at the latter station I shall indicate the parts thereof by reference-figures, and the same figures primed will denote the corresponding features of the apparatus at station B. It will be unnecessary, therefore, to refer specifically to the construction and relative arrangement of said features at station B, as the same will be fully understood from the following description of station A. The operation of the current at station B will, however, be pointed out hereinafter.

Referring to the drawings, station A, the transmitters are indicated by No. 1 and No. 2 and the magnetic relays by No. 3 and No. 4. The battery is denoted by the figure 5, and it is in three subdivisions, 6, 7, and 8, the subdivision 6 having, for purposes of description, fifty cells, 7 sixty cells, and 8 seventy-five cells. The number of cells in the battery will of course vary, according to the length of the line, the number specified being about the strength required for a line extending, say, about ninety miles. The battery at one station will have its zinc pole and at the opposite station its copper pole to the line; hence the two batteries will agree, and a current will ensue.

The transmitter No. 1 is of the usual construction employed in quadruplex telegraphy, and is known as a "Stearns transmitter." It is actuated to open and close by the usual form of key in connection with a local battery and the electro-magnet 9 in the customary manner.

The transmitter No. 2 consists of an armature, 10, pivotally secured at about its center, and the ends of which are insulated from each other, as indicated. Upon the armature 10, adjacent to its center, is a standard, 11, upon which is secured one end of the circuit-spring 12, the other or free end thereof terminating in suitable relation to the end of the armature to be brought in contact with it at 13, or relieved therefrom at the proper time. Upon the standard 11 there is secured in contact with the spring 12 one end of the wire 14, the other end of which is secured to the contact-screw 15, located over the circuit-spring 16 of the transmitter No. 1. The left-hand end of the armature 10 of the transmitter No. 2 terminates directly over the circuit-spring 17 and between the stops or resting-contacts 18 and 19. The circuit-spring 17 is secured to the insulated standard 18″, and is in electrical connection with the wire 19″, which passes from the said standard 18″ to the transmitter No. 1. Below the armature of transmitter No. 2 is provided the usual electro-magnet, 20, which is employed, in connection with the well-known second key and local battery, to operate the transmitter in the customary manner. Each of the transmitters Nos. 1 and 2 is provided with the usual retractile spring, whose force is exerted to draw the armature from the electro-magnets 9 and 20, respectively.

The magnetic relay No. 3 consists of the pivoted armature 21, having upon its right-hand side, opposite to its upper portion, the two electro-magnets 22 and 23, and upon its left-hand side, adjacent to its lower portions, the two independent electro-magnets 24 and 25. The upper extremity of the armature 21 is between the resting-contact or stop 26 and the working-contact 27, and the lower end of the armature is provided on the side opposite to the electro-magnets 24 and 25 with the retractile spring 26″, the force of which is exerted to throw the upper end of the armature against the resting-contact 26. The electro-magnets 22, 23, 24, and 25 are all independent, and are separately adjusted according to the strength of the outgoing currents, as will be hereinafter explained. From the working-contact 27 a local wire, 28, passes to the electro-magnet 29 of the sounder or receiving device 30, and from the armature 21, at any point where an electrical contact may be secured, but preferably at its sustaining-pivot, there extends a wire, 31, to the zinc pole of the battery 32, from the copper pole of which passes the wire 33, which, at the point 34, merges into the two wires 35 and 36. The wire 35 passes around the upper half of the electro-magnet 37 of the sounder or receiving-instrument 38, and thence to the electro-magnet 29 of the sounder 30. The wire 36 coils around the lower half of the electro-magnet 37 in the opposite direction to that of the wire 35 on the upper half thereof, and passes from said magnet to the rheostat 39, and thence to the pivot of the armature 40 of the magnet-relay No. 4.

The magnetic relay No. 4 consists of the armature 40, above mentioned, having adjacent to the right-hand side of its upper portion the electro-magnets 41 and 42, and opposite to its portion on the left-hand side the electro-magnets 43 and 44, the lower extremity of the armature being drawn, when in its normal condition, from the said electro-magnets by the retractile spring 45. The upper extremity of the armature 40 is between the stop or resting-contact 46 and the lower end of the operating-lever 47, beyond which there is another stop or resting-contact, 48. On the left-hand side of the operating-lever 47 is a contact, 49, upon which the lever in its normal condition is caused to impinge by the retractile force of the spring 50. The contact 49 is connected with the zinc pole of the local battery 32 by the wire 51.

The main line, extending from station A to station B, is denoted by the numeral 52″. It passes from the upper end of the circuit-spring 16 of the transmitter No. 1 at station A to the like part of the transmitter No. 1′ of station B. From the transmitter No. 1 wires 14 and 19″ pass to the transmitter No. 2, station A, in the manner hereinbefore described. From the working-contact 52, located over the circuit-spring 17, transmitter No. 2, a wire, 53, passes to the electro-magnet 24, thence to the electro-magnet 43, and from the latter magnet to the ground, being connected with the subdivision 6 of the battery 5 by a wire, 54, before being grounded; and from the left-hand end of the armature 10 of transmitter No. 2 a wire, 55, extends to the electro-magnet 25, from said magnet to the electro-magnet 44, and thence to the battery 5, between the subdivisions 6 and 7. It is not essential, however, to the successful working of the circuit on wire 53 that it be connected with the battery by the wire 54. At the right-hand end of the transmitter No. 2 there are two wires, 56 and 57, which pass to the magnetic relays, and thence to the battery. The wire 56 extends from the contact-screw 58 (located over the circuit-spring 12) to the electro-magnet 22, thence to the electro-magnet 41, and from there to the right-hand end of the battery 5. The wire 57 passes from the right-hand end of the armature 10 of transmitter No. 2 to the electro-magnet 23, thence to the electro-magnet 42, and from said last-mentioned magnet to the battery between the subdivisions 7 and 8.

The construction of the apparatus illustrated and embodying my invention having been set forth above, I will now proceed to describe its operation under the different conditions of the keys. It must be borne in mind that each of the electro-magnets forming part of the relays No. 3 and No. 4 is independent of the others, is separately adjusted above the strength of the outgoing current traversing its helices, and that a distinct electro-magnet is provided for each outgoing current.

In the description of the operation of the invention I will first refer particularly to Fig. 1, which illustrates the first condition of the apparatus—that is, when transmitters No. 1 and No. 2 are both open; and when the transmitters are thus open there will be no outgoing current and the magnets can only be affected by an incoming current, which, when a communication is being transmitted from station B, will pass over the line 52″, circuit-spring 16, and transmitter No. 1, thence over the wire 19″, circuit-spring 17, working-contact 52, and thence through the wire 53 and magnets 24 and 43 to the ground. In Fig. 1 of the drawings, however, the transmitter at both station A and station B are open, and when they are in this condition there will be no current on the line in either direction. If, however, an incoming current of fifty cells is on the line, the electro-magnet 43 will throw the upper end of the armature 40 in contact with the lower end of the lever 47, completing a circuit through the said armature and lever and the contact 49, wire 51, local battery 32, and wire 36, which encompasses the lower half of the differential magnet 37. The undulations of the incoming current of fifty cells, above described, operate, through the said elements composing the lower half of the local circuit, the receiving-sounder 38. The incoming current aforesaid passes through both the electro-magnets 24 and 43, but does not affect the sounder 30, because the electro-magnet 24 is adjusted too far from the armature 21 to influence it when a current of only fifty cells is on the line. When a current of, say, one hundred and ten cells, or the strength of the first two subdivisions of the battery 5, is on the line from station B, it will (the transmitters No. 1 and No. 2 being still open) pass through the same wires and magnets which were traversed by the current of fifty cells, above specified, and its effect will be to influence the magnet 43 to throw the upper end of the armature 40 in contact with the lower end of the lever 47 and the magnet 24, to cause the armature 21 to move against the working-contact 27, thus completing a circuit through both the upper and the lower half of the locals, the current in the upper half operating the sounder 30, while the sounder 38 in the lower half remains open, owing to the fact that the battery is allowed to flow equally through each side of the differential electro-magnet 37, producing no effect. When the full strength of the battery (or one hundred and eighty-five cells) is given to the line, its passage to the earth at station A (the transmitters Nos. 1 and 2 being open, as before) will be through the magnets 24 and 43, above described; and under this strength of current the magnet 24 will close the armature 21 against the working-contact 27, and actuate the armature 40 sufficiently to move it against the lever 47 and the lever 47 against the resting-contact or stop 48, breaking the circuit through the lower half of the locals at 49, the circuit through the upper half thereof being intact. The receiving-sounder 38 will thus be actuated and the sounder 30 will remain unaffected. The magnets 24 and 43 are adjusted with relation to their armatures so as not to effect them except in the manner and under the strength of the incoming current, above described. The strength of the incoming current will of course vary according to the position of the transmitters No. 1' and No. 2', and when both of said transmitters are open there is no current on the line. When both said transmitters are closed, the whole battery of one hundred and eighty-five cells is thrown to the line. When transmitter No. 1' is open and No. 2' is closed, fifty cells of the battery are given to the line, and when transmitter No. 2' is open and No. 1' is closed a current represented by one hundred and ten cells is sent to the line.

The wires and magnets through which the currents of varying strength are given to the line at station B, according to the positions of transmitters No. 1' and No. 2', will be at once understood from the description of the outgoing currents from and arrangement of devices at station A, hereinafter presented, the elements of the apparatus and their operation being the same at both stations. It is believed, however, that by confining the further description to station A the adjustment and arrangement of the magnets will be more clearly understood. As above mentioned, when the transmitters No. 1 and No. 2, station A, are open there is no current. When both these transmitters are closed, the current of one hundred and eighty-five cells' strength to the line is through the wire 56, electro-magnets 41 and 22, circuit-spring 12, wire 14, and circuit-spring 16, as indicated by the arrows in Fig. 2 of the drawings. When transmitter No. 1 is open and transmitter No. 2 closed, (shown in Fig. 3,) the outgoing current of fifty cells passes through the wire 55, electro-magnets 44 and 25, armature 10, circuit-spring 17, wire 19", and transmitter No. 1, as indicated in Fig. 3; and when transmitter No. 1 is closed and transmitter No. 2 open, the current passes from the battery through wire 57, electro-magnets 42 and 23, right-hand end of armature 10, circuit-spring 12, wire 14, and circuit-spring 16. These outgoing currents will influence the sounders 30' and 38' in the same manner as the sounders 30 and 38 are affected by the incoming currents, as above described and more fully considered hereinafter; but said outgoing current will have no effect on the sounders 30 and 38 at station A.

It will be apparent from the foregoing that when transmitters Nos. 1 and 2 are open the incoming currents will act on the relays Nos. 3 and 4 through the magnets 24 and 43, and when transmitters Nos. 1' and 2' are open the outgoing currents from station A will act upon the relays Nos. 3' and 4' through the magnets 24' and 43', the said magnets having been adjusted to permit this action under the conditions specified. It will be apparent, also, that when the current is passing either to station A or to station B, and the transmitters at the receiving-station are moved in the act of transmitting a communication in the opposite direction, the passage of the current, which was previously through the electro-magnets 24 and 43, or 24' and 43', will be altered according to the position of the transmitters at the receiving-station. For example, please suppose that in the act of transmitting signals to station A from station B the transmitters Nos. 1 and 2 should have become closed while forwarding a communication in the opposite direction. The current, instead of passing through the electro-magnets 24 and 43, as before, would now have to pass through the magnets 22 and 41, owing to the changes in the circuit-connections made by closing transmitters Nos. 1 and 2. If we can suppose that the incoming current from station B is of one hundred and eighty-five cells strength, or the full battery, and the transmitters Nos. 1 and 2 at station A are closed, it will be plain that there will not only be one hundred and eighty-five cells on the line from station B, but that an additional current of equal strength from the battery at station A will be given to the line, making a total electro-motive force of three hundred and seventy cells, all of which at station A must pass through the electro-magnets 22 and 41. Now, these magnets are adjusted with relation to their armatures so as not to affect them unless an electro-motive force of more than one hundred and eighty-five cells is exerted on them. Thus it is obvious that the outgoing current alone, no matter what the position of the keys at station B may be, could not affect the said electro-magnets 22 and 41; hence there would be no signal caused at station A by working the transmitters Nos. 1 and 2. When, however, the current of three hundred and seventy cells strength is on the line, the electro-magnets 22 and 41 will actuate the armatures 21 and 40 to make and break the upper half of the local circuit operating the sounders 30 and 30', the sounder 30 recording the signals from station B, and 30' those from station A. When the position of either of the transmitters is changed, the current is shifted to another set of wires and electro-magnets, according to which contacts are made or broken. The electro-magnets at each station are adjusted separately above the strength of the outgoing current, but are affected by the incoming current.

Thus it will appear plain to those skilled in the art that by means of my apparatus messages may be transmitted in either direction, separately or simultaneously, without the outgoing currents affecting the sounders at the transmitting station or stations.

From the foregoing the passage of the currents through the wires and magnets under the different positions of the keys will be obvious without a more lengthy description.

What I claim as my invention, and desire to secure by Letters Patent, is—

1. In a telegraph apparatus, the transmitter, having a circuit-spring which is electrically connected with the main line, and which, as the transmitter is actuated, is adapted to play against a contact forming a part of the transmitter and an independent working-contact, respectively, the latter contact being connected with an electro-magnet of a magnetic relay, and thence with the battery and earth, the former contact being in electric connection with an independent electro-magnet of said relay, in combination with a conductor leading to earth from said independent electro-magnet, the armature of said magnetic relay, and a sounder or receiving-instrument operated thereby, one of said electro-magnets being independently adjusted above the strength of the outgoing current and brought into use when the key at the home station is operated, substantially as set forth.

2. In a quadruplex apparatus, transmitters No. 1 and No. 2, and magnetic relays No. 3 and No. 4, and electric connections, each relay consisting of its armature and electro-magnets, an electro-magnet being provided for each outgoing current and being independently adjusted above the strength of said current, substantially as set forth.

3. A multiple telegraph system in which the relays consist of an armature and electro-magnets, a separate electro-magnet being provided for each outgoing current, and being independently adjusted above the strength of said current, substantially as set forth.

4. In a multiple telegraph apparatus, relays Nos. 3 and 4, each consisting of its armature and electro-magnets, in combination with the line, branch circuits, and subdivided battery, a separate electro-magnet being provided for each outgoing current, and being independently adjusted above the strength of said current, substantially as set forth.

5. In a quadruplex telegraph system, the combination of the transmitters Nos. 1 and 2 with the magnetic relays Nos. 3 and 4 and the subdivided battery 5, the transmitter No. 1 being connected with the line and by branch wires 14 and 19'' with transmitter No. 2, from which branch wires 53, 55, 56, and 57 pass to the electro-magnets of the said magnetic relays, and thence (with the exception of wire 53) to the subdivisions of the battery and to the earth, the wire 53 being also grounded, substantially as set forth.

6. In a multiple telegraph apparatus, the magnetic relays, each consisting of its armature and electro-magnets, in combination with the line, branch wires, battery, sounders 30 and 38, locals 28, 35, 36, 33, and 51, local battery 32, and operating-lever 47, a separate electro-magnet being provided for each outgoing current, and being independently adjusted above the strength of said current, substantially as set forth.

7. In a multiple telegraph system, the transmitter No. 1, which is in connection with the line and is connected with the transmitter No. 2 by branch wires 14 and 19'', said wires being insulated from each other at transmitter No. 2, in combination with the magnetic relays Nos. 3 and 4, subdivided battery 5, and branch wires 53, 55, 56, and 57, each leading from the transmitter No. 2, and each connected with a separate electro-magnet of each of the relays, an independent electro-magnet being arranged for each outgoing current, and being separately adjusted above the strength of said current, substantially as set forth.

In testimony whereof I affix my signature in presence of two witnesses.

GEORGE W. GARDANIER.

Witnesses:
CHAS. C. GILL,
HERMAN GUSTOW.